United States Patent Office 2,772,895
Patented Dec. 4, 1956

2,772,895

FIFTH WHEEL SAFETY LOCK

Walter D. Steeves and Raymond V. Meaden,
Vancouver, British Columbia, Canada

Application October 19, 1954, Serial No. 463,209

2 Claims. (Cl. 280—432)

The subject of this invention is a coupling as usually required between tractors and semi-trailers. Semi-trailers are usually provided with wheels for supporting the rear end, but the forward end rests on a tractor which draws the trailer. Generically the trailer is detachable from the tractor and many trailers include a special supporting member and small wheels attached to it to support the forward end of the trailer when it is detached from the tractor.

To support the semi-trailer when attached to the tractor and to allow the necessary freedom of motion in following the tractor in curves, a fifth wheel is provided and its lower part is fastened to the tractor. Special members are provided in this fifth wheel to lock corresponding members of the trailer in place. Usual means of this kind are, i. e., king pins kept in place by means of jaws which are locked in the closed position by engaging members of different types. Devices used for this purpose at the present time are known to become ineffective due to worn-out jaws deformed under the pressure of the king-pin and fail finally to hold the king pin in place. A principal object of this invention is to overcome this defect by providing in the fifth wheel additional locking members which prevent release of the coupling.

Other advantages of this invention will be apparent as it is better understood from the following description by drawings to illustrate an embodiment thereof:

Figure 3 is a cross section of the same embodiment.

Figure 1:
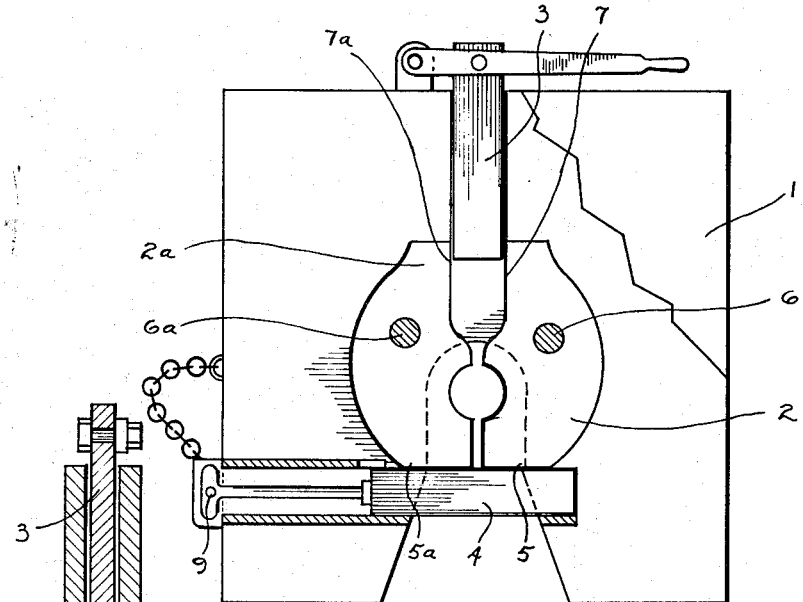
Figure 1 is a top view of an embodiment showing the coupling closed and safely secured.

On the drawings wherein like parts are designated by similar numerals of reference, throughout the several views, the lower parts of a fifth wheel are shown only, which are always fastened to a truck or trucking vehicle. A plate with a flat upper surface is adapted to slidably engage a trailer having an upper fifth wheel plate, with a king pin. The king pin is or may be formed integrally with the upper part or may be suitably attached thereto. Usually the lower part of the king pin is increased to form a shoulder securing the upper fifth wheel against vertical displacement.

In the lower fifth wheel member a pair of jaws 2 and 2a are provided and turnably attached to corresponding axles 6. Due to the shape of the jaws 2 and 2a a locking member 3 can be engaged with the two parallel planes 7 and 7a of said jaws, so that the latter are locked in the closed position. In a guideway formed by attached members between the plates 1 and 8 or integrally with said plates, an interlocking cross member 4, is slidably placed across the plane ends 5, of the jaws 2 and 2a and can be held securely in the interlocking position by means of a pin 9.

Figure 2:
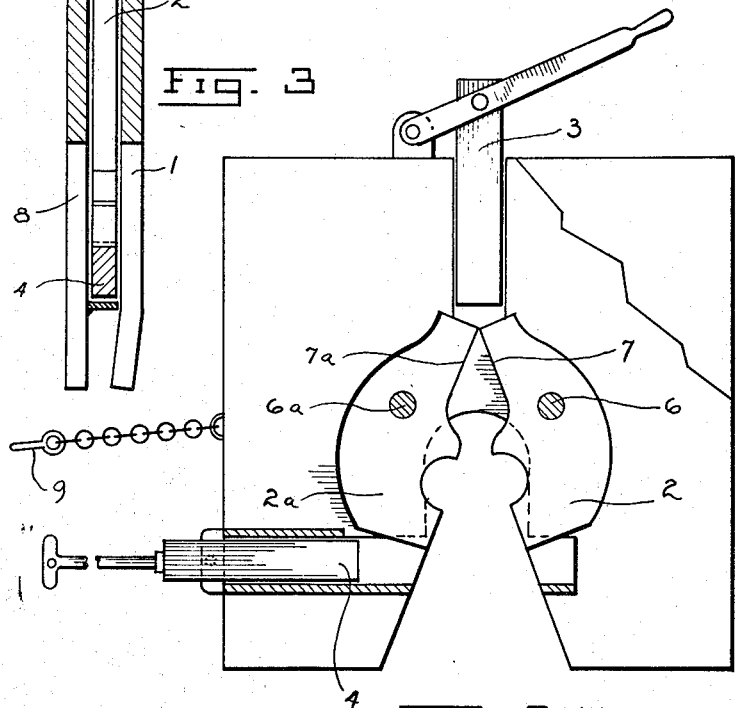
Figure 2 is a top view of the same embodiment showing the coupling open.

In application and use of this invention, the upper part of the fifth wheel is attached to the vehicle originating motion to the systems to be coupled. Both locking members 3 and 4 must be removed in accordance with the arrangement indicated in Figure 2. Displacement of said parts can be obtained manually or by any means for remote operation such as combination of levers, chains and springs, electric magnets, or hydraulics. Remote operation is preferably controlled from elements installed near the seat of the driver in such a way that the driver need not leave his seat to operate the coupling. Both jaws 2 and 2a are kept open under influence of springs (not shown) as soon as permitted by the position of the locking members 3 and 4. To couple both vehicles, a relative motion of one with regard to the other is necessary to lead the king pin between the open jaws 2 and 2a. Due to the pressure of the king pin against eccentric points of the jaws 2 and 2a, they are turned to the closed position. In this position only the locking members 3 and 4 can be set in place and if necessary secured additionally by means of a pin 9. If a trailer was already released from the unlocked coupling, then the same or another trailer can be attached again to the coupling device. Backing the tractor into the trailer that the king pin enters between the same engaging members causes the same sequence of steps as described above.

It is obvious that the jaws and the locking members may be mounted in any suitable manner and said locking members may be used and operated for engaging and holding the jaws either independently or simultaneously and that various changes and modifications in size, proportion and design may be made in the above specifically described structure without departing from the spirit of this invention, the changes and modifications being restricted only by the scope of the following claims.

We claim:

1. In a coupling means for a trailer and tractor vehicle having a fifth wheel plate on the tractor vehicle and a king pin on the trailer for engagement in a slot in the fifth wheel plate, a pair of parallel clamping members pivotally mounted intermediate their ends on the fifth wheel plate having jaws in the confronting edges of their forward ends for engagement with the king pin of the trailer, a locking bar slidably mounted on the fifth wheel plate for longitudinal movement between the rear ends of said clamping members to hold the forward ends of said clamping members in engagement with the king pin, and a second locking bar slidably mounted on said fifth wheel plate for transverse movement across the slot of the plate in bearing engagement with the forward ends of said clamping members for holding said members against pivotal movement.

2. In a coupling means of the character described in claim 1 including means for securing said second locking bar in locked position.

References Cited in the file of this patent

UNITED STATES PATENTS

| | | |
|---|---|---|
| 1,641,354 | Reid | Sept. 6, 1927 |
| 1,999,375 | Seyferth et al. | Apr. 30, 1935 |
| 2,077,484 | King | Apr. 20, 1937 |
| 2,096,282 | Kortering | Oct. 19, 1937 |
| 2,431,779 | Stevens | Dec. 2, 1947 |